No. 709,564. Patented Sept. 23, 1902.
C. M. THOMPSON.
PIVOTED ROCKER BEARING CENTER PLATE FOR RAILWAY CARS.
(Application filed May 12, 1902.)
(No Model.)
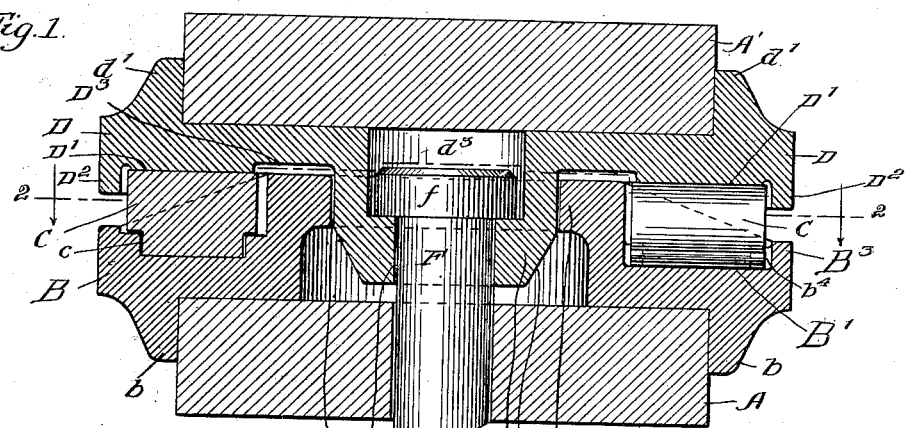
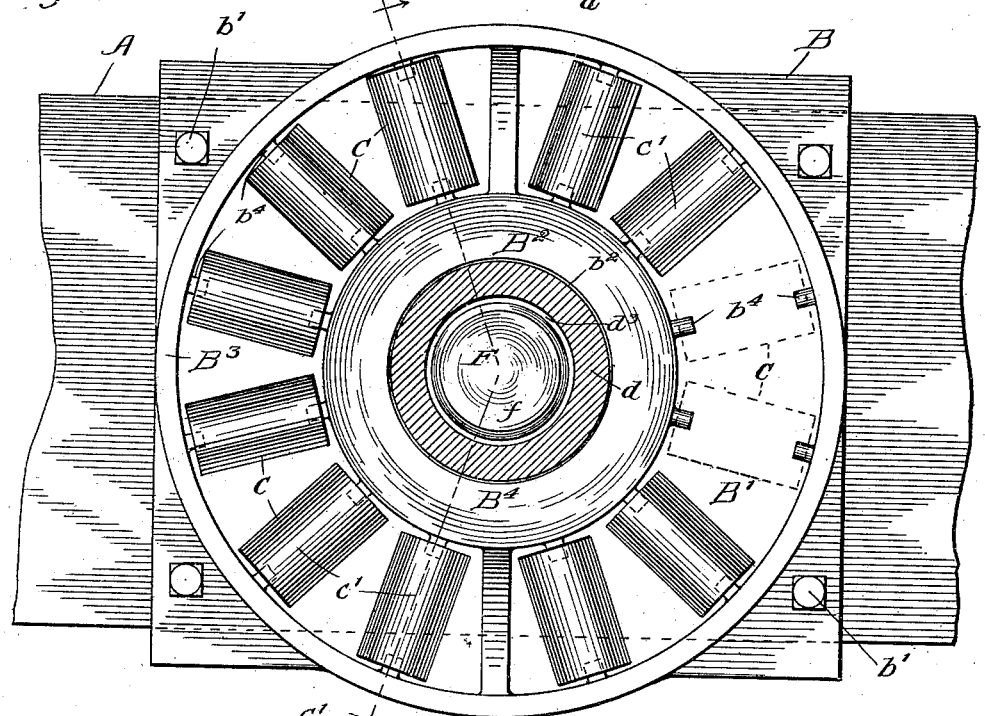
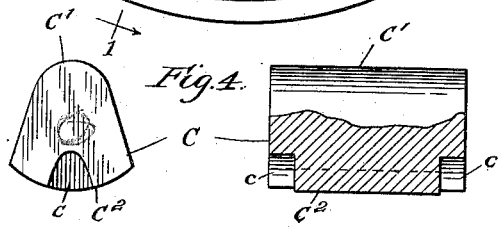
Witnesses:
Wm. Geiger
A. W. Munday
Inventor:
Channing M. Thompson
By Munday Evarts & Adcock
Attorneys

UNITED STATES PATENT OFFICE.

CHANNING M. THOMPSON, OF NEWARK, OHIO.

PIVOTED ROCKER-BEARING CENTER-PLATE FOR RAILWAY-CARS.

SPECIFICATION forming part of Letters Patent No. 709,564, dated September 23, 1902.

Application filed May 12, 1902. Serial No. 106,861. (No model.)

*To all whom it may concern:*

Be it known that I, CHANNING M. THOMPSON, a citizen of the United States, residing in Newark, in the county of Licking and State of Ohio, have invented a new and useful Improvement in Pivoted Rocker-Bearing Center-Plates for Railway-Cars, of which the following is a specification.

My invention relates to improvements in center-plates for railway-cars.

The object of my invention is to provide a rocker-bearing center-plate of a strong, simple, efficient, and durable construction that will operate to successfully and properly sustain the extremely heavy loads to which they are subjected and at the same time permit the truck to turn or swivel freely in respect to the car-body without undue friction and also form a safe and secure connection between the car-body and truck.

My invention consists in the means I employ to accomplish this object or result—that is to say, it consists, in connection with the truck-bolster and body-bolster of a railway-car or other vehicle, of a truck center-plate secured to the truck-bolster and provided with an annular channel or track to receive a series of radially-disposed rockers and with a central opening or bearing to receive the central hub or pivot portion of the upper or body center-plate, an upper or body center-plate secured to the body-bolster and provided with a track or channel for the series of rockers, and with a central hub or pivot portion fitting in the bearing or central opening of the truck center-plate, and a series of radially-disposed concentric rockers interposed between the upper and lower center-plates and each having its lower circular bearing-surface track on a larger radius than its upper concentric circular bearing-surface and furnished at each end with recesses to receive radially-extending lugs or projections, which are formed on the lower or truck center-plate and which thus engage the rockers at their lower portions and insure their rocking movement as the lower center-plate pivotally turns in respect to the upper center-plate.

My invention also consists in the novel construction of parts and devices and in the novel combinations of parts and devices herein shown or described.

In the accompanying drawings, forming a part of this specification, Figure 1 is a central vertical section, the same being taken centrally through one of the rockers on the broken line 1 1 of Fig. 2. Fig. 2 is a plan view of the lower center-plate and rockers looking from the broken line 2 2 of Fig. 1 and showing the central pivot or hub portion of the upper center-plate in section. Fig. 3 is an end view of one of the rockers; and Fig. 4 is an elevation, partly in section, of one of the rockers.

In the drawings, A represents the truck-bolster, and A' the body-bolster, of a railway-car or other vehicle.

B is the truck center-plate, the same having flanges $b$ to receive and embrace the truck-bolster, which is secured thereto by bolts $b'$. The truck center-plate B is provided on its upper face with an annular track, channel, way, or bearing B' to receive the rockers C and with inner and outer flanges $B^2$ $B^3$ to confine the rockers endwise or radially. The lower or truck center-plate B also has a central opening or bearing $b^2$ to receive the central hub or pivot portion $d$ of the upper or body center plate D. The upper or body center plate D has an annular track or bearing D' on its lower face for the rockers C and is provided with an outer flange $D^2$, partially embracing the ends of the rockers C, which are interposed radially between the body and truck center-plates. The body center-plate D is provided with flanges $d'$, embracing the body-bolster A', to which the center-plate D is secured. The centrally-projecting pivot or hub portion $d$ of the upper center-plate D is furnished with a tapered end $d^2$ to facilitate the entering of the body center-plate into the truck center-plate when the car-body is lowered onto the truck. Although the downwardly-projecting pivot or hub portion $d$ of the upper center plate entering the circular opening or bearing in the lower center-plate serves to pivotally connect the center-plates together, a center-pin F may be employed, if desired, and for this purpose the upper center-plate is furnished with a recess or opening $d^3$ to receive the head $f$ of the center-pin and a smaller opening $d^4$ for the center-pin to pass through.

The rockers C each have concentric upper and lower curved bearing-faces $C'$ $C^2$, each struck from the same center, but with different radii, the lower bearing-surface $C^2$ being the larger. As the upper and lower curved bearing-surfaces $C'$ $C^2$ are concentric with each other or struck from the same center, the turning of the center-plates and the rocking of the rockers will not tend to raise or lower the upper center-plate from the car-body resting thereon. To insure the proper rocking of the rockers and to keep them in their proper radial position, each of the rockers is provided at its lower ends or corners with recesses $c\,c$ to receive lugs or projections $b^4\,b^4$, which project radially from the inner flange $B^2$ and the outer flange $B^3$ on the lower center plate. Each bearing-surface of each rocker is a sector of a cylinder, the lower bearing-surface of each rocker being a sector of a larger cylinder than that of the upper bearing-surface thereof. This coöperative action of the interengaging lugs and recesses $b^4\,c$ insures a slight slipping movement of the upper center-plate in respect to the rockers, which serves to keep the curved upper bearing-surface of the rockers properly rounded, while at the same time it is not sufficient to cause material friction. As the interengaging lugs and recesses $b^4\,c$ act upon the lower portion of the rockers at the corners thereof, they exert sufficient leverage upon the rockers to insure their proper turning or rocking movement and prevent all tendency of the rockers to stick or remain stationary, which would soon destroy or interfere with their efficiency by causing flat spots to be worn thereon. By my construction and coöperative combination of parts both the upper and lower center-plates and interposed rockers may all be made of an exceedingly strong, simple, and durable construction and the number of the rockers may be so increased and their aggregate bearing-surfaces made sufficiently great to properly sustain the heaviest loads, while at the same time the connection between the upper and lower center-plates is safe and secure.

The lower center-plate B is provided with a bearing-surface $B^4$, which coöperates with the bearing-surface $D^3$ on the upper center-plate in the event of the rockers C becoming lost by derailment of the car or other accident.

I claim—

1. In a railway car or vehicle, the combination with the truck and body bolster of a lower center-plate secured to the truck-bolster and provided with an annular track or channel for rockers, a body center-plate furnished with an annular track or bearing for rockers, a series of interposed radially-arranged rockers each having concentric upper and lower curved bearing-surfaces of different radii and provided with recesses in their ends at their lower portions, said lower or truck center-plate having a series of radial lugs or projections fitting in the recesses of the rockers to insure the rocking movement of the rockers and maintain their radial position, substantially as specified.

2. In a railway car or vehicle, the combination with the truck or body bolster of a lower center-plate secured to the truck-bolster and provided with an annular track or channel for rockers, a body center-plate furnished with an annular track or bearing for rockers, a series of interposed radially-arranged rockers each having concentric upper and lower curved bearing-surfaces of different radii and provided with recesses in their ends at their lower portions, said lower or truck center-plate having a series of radial lugs or projections fitting in the recesses of the rockers to insure the rocking movement of the rockers and maintain their radial position, said upper center-plate having a projecting central pivot or hub portion fitting in a central opening or bearing in the lower center-plate and pivotally connecting the center-plates together, substantially as specified.

3. The combination with a lower or truck center-plate having inner and outer flanges and an annular track or bearing for rockers between said flanges and a central pivot opening or bearing, of an upper or body center-plate having an annular track or bearing for rockers, an outer flange embracing the outer ends of the rockers and a central pivot or hub portion fitting in the central opening of the lower center-plate and a series of radially-arranged rockers interposed between the upper and lower center-plates and having upper and lower concentric bearing-surfaces of different radii, substantially as specified.

4. The combination with a lower or truck center-plate B having flanges $b$ to embrace the truck-bolster and provided with an annular track $B'$ for rockers, inner flange $B^2$, outer flange $B^3$, a central opening $b^2$, of upper or body center-plate D having flanges $d'$ embracing the body-bolster, an annular track or bearing $D'$ for the rockers, outer flange $D^2$, central hub portion $d$ furnished with tapered end $d^2$ and radially-disposed rockers C having upper and lower concentric curved bearing-surfaces $C'$ $C^2$ and recesses $c$ in their ends, said lower center-plate B having a series of lugs or projections $d^4$, substantially as specified.

5. The combination of a lower center-plate provided with an annular track or channel for rockers, of an upper center-plate furnished with an annular track or bearing for rockers, a series of interposed radially-arranged rockers having concentric upper and lower bearing-surfaces of different radii and connections for causing the rockers to rock as the center-plates turn in respect to each other, substantially as specified.

6. The combination of a lower center-plate provided with an annular track or channel for rockers, of an upper center-plate furnished with an annular track or bearing for rockers, a series of interposed radially-arranged rockers having concentric upper and lower bearing-surfaces of different radii and connections for causing the rockers to rock as the center-plates turn in respect to each other, one of said center-plates having a central opening or bearing and the other a central pivot or hub portion fitting in said central opening, substantially as specified.

7. The combination with a pair of center-plates each having an annular track or bearing for rockers and one provided with a central opening or bearing and the other with a central pivot or hub fitting therein and a series of concentric rockers interposed between said center-plates and a series of interengaging lugs and recesses on the rockers and one of said center-plates to cause the rockers to rock and retain them in position as the center-plates turn in respect to each other, substantially as specified.

CHANNING M. THOMPSON.

Witnesses:
G. H. FRANKLIN,
J. G. PLATT.